(12) United States Patent
Ams et al.

(10) Patent No.: US 8,104,510 B2
(45) Date of Patent: Jan. 31, 2012

(54) DEVICE FOR REGULATING THE FLOW OF A LIQUID OR GASEOUS MEDIUM

(75) Inventors: Felix Ams, Kaempfelbach (DE); Peter Metternich De Oliveira, Kieselbronn (DE)

(73) Assignee: Asco Joucomatic GmbH, Oelbronn-Duerr (DE)

( * ) Notice: Subject to any disclaimer, the term of this patent is extended or adjusted under 35 U.S.C. 154(b) by 721 days.

(21) Appl. No.: 12/199,064

(22) Filed: Aug. 27, 2008

(65) Prior Publication Data
US 2009/0146091 A1 Jun. 11, 2009

(30) Foreign Application Priority Data
Dec. 8, 2007 (EP) .................................. 07023808

(51) Int. Cl.
*F16K 11/044* (2006.01)
(52) U.S. Cl. ................................. 137/625.44
(58) Field of Classification Search .............. 137/625.44
See application file for complete search history.

(56) References Cited

U.S. PATENT DOCUMENTS

| | | | |
|---|---|---|---|
| 3,590,694 A * | 7/1971 | Prescott et al. ................... | 92/20 |
| 3,683,962 A | 8/1972 | Good | |
| 4,446,889 A * | 5/1984 | Sakakibara et al. ....... | 137/625.4 |
| 4,765,370 A * | 8/1988 | Ariizumi et al. ......... | 137/625.65 |
| 5,040,567 A * | 8/1991 | Nestler et al. ............ | 137/625.44 |
| 5,318,071 A * | 6/1994 | Gaiardo .................... | 137/625.65 |
| 5,711,346 A * | 1/1998 | Pieloth et al. ............ | 137/625.44 |
| 6,186,175 B1 * | 2/2001 | Frisch et al. ............. | 137/625.66 |
| 6,394,136 B1 * | 5/2002 | Rohrbeck ................ | 137/625.44 |

FOREIGN PATENT DOCUMENTS

| DE | 73 24 333 | 9/1973 |
|---|---|---|
| EP | 1 045 150 | 10/2000 |
| EP | 1 536 169 | 6/2005 |

* cited by examiner

*Primary Examiner* — John Fox
(74) *Attorney, Agent, or Firm* — Michael J. Striker

(57) ABSTRACT

The invention relates to a device for regulating the flow of a liquid or gaseous medium, having a valve housing (11), which has at least one valve inlet (15, 16) and a valve outlet (17) as well as at least one valve opening (18, 19), located between the two and surrounded by a valve seat (21, 22); having a valve member (23) controlling the valve opening (18, 19); and having a valve member actuating device (14), which has a valve closing spring (36) and an actuator (37) operating counter to the valve closing spring. For creating a robust device with a long service life, and in which the valve member actuating device (14) is hermetically separated from the medium, the valve member (23) has a closing body (24), cooperating with the at least one valve seat (21, 22), and a frame (25), separated from the medium, for engaging the valve member actuating device (14), which frame surrounds the closing body (24) and is solidly joined to it.

17 Claims, 3 Drawing Sheets

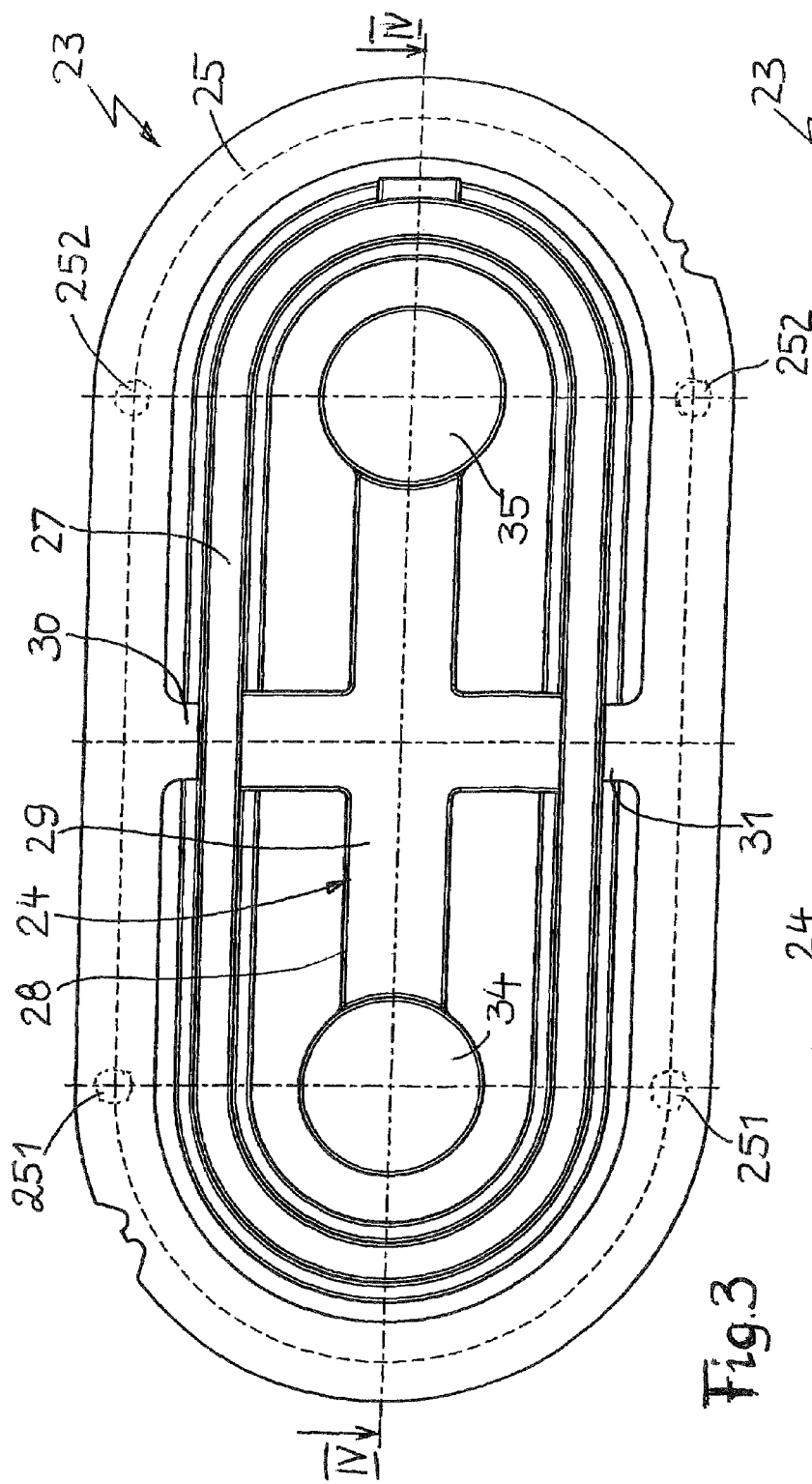
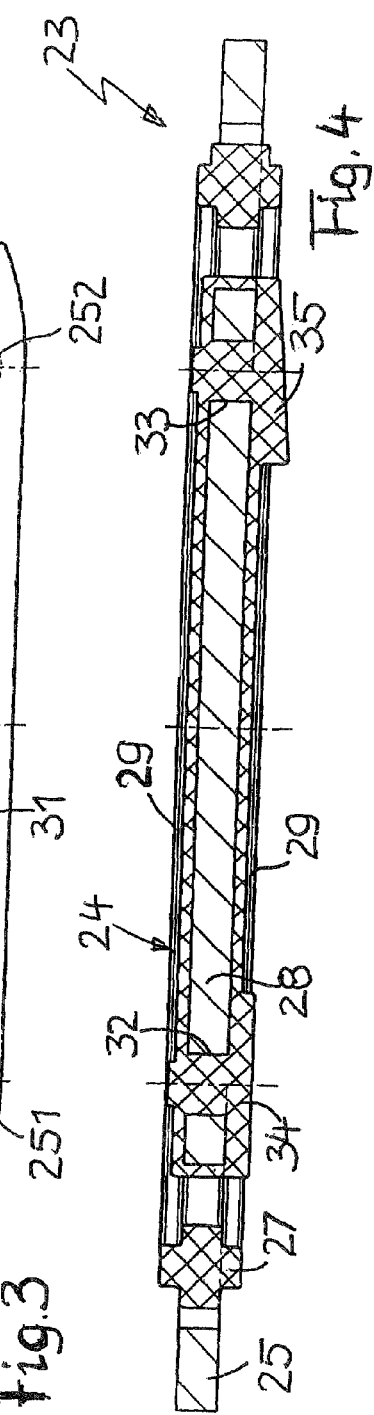

DEVICE FOR REGULATING THE FLOW OF A LIQUID OR GASEOUS MEDIUM

CROSS-REFERENCE TO A RELATED APPLICATION

The invention described and claimed hereinbelow is also described in European Patent Application EP 07023808.4 filed Dec. 8, 2007. This European Patent Application, subject matter of which is incorporated herein by reference, provides the basis for a claim of priority of invention under 35 U.S.C. 119(a)-(d).

BACKGROUND OF THE INVENTION

One known device for regulating a medium (European Patent Disclosure EP 1 536 169 A1) has a valve housing with a valve inlet and a valve outlet as well as a valve opening, located between the valve inlet and the valve outlet, that is surrounded by a valve seat. The valve opening and the valve seat are located in a valve chamber. The valve seat, for opening and closing the valve opening, cooperates with a valve member that is secured to the face end of an armature of an electromagnet, the armature protruding into the valve chamber.

The armature is guided axially displaceably in a guide sleeve, which in turn is inserted into the valve chamber and is sealed off in it from the chamber wall. A valve closing spring is located in a blind bore of the armature and is braced on one end on the armature and on the other on an adjusting pin that is accessible from the outside, and when the electromagnet is not excited, the valve closing spring, via the armature, presses the valve member against the valve seat.

When current is supplied to the electromagnet, the armature is displaced axially counter to the spring force of the valve closing spring, and the armature lifts the valve member from the valve seat, thus uncovering the valve opening, and depending on the stroke of the valve member, a greater or lesser quantity of a medium flows from the valve inlet to the valve outlet via the valve chamber. The valve chamber is constantly filled with medium, so that the valve member and the face end of the armature are always bathed by the medium.

SUMMARY OF THE INVENTION

The object of the invention is to disclose a device for regulating the flow of a liquid or gaseous medium of the type defined at the outset, which with strict separation from the medium of the actuating device for the valve member that controls the flow of the medium, is sturdy and has a long service life.

The device according to the invention has the advantage of a structurally stable valve member, and by the subdivision into a closing body, bathed by the medium, and a frame separated from the medium, the actuating device engaging the frame, to the magnitude of the flow of medium, does not come into contact with the flow of the medium for actuating the closing body. Thus the device can be used with long service lives for the regulating the flow of aggressive gaseous or liquid media. The valve member can be manufactured economically, especially whenever, in a preferred embodiment of the invention, the frame and the support of the closing body as well as the ribs that join the frame and the support are manufactured as a one-piece stamping from a metal sheet, and the regions of the valve member exposed to the medium, that is, the support, are covered with a coating, for instance of plastic, rubber, an elastomer, or the like.

Further special characteristics of the invention and features of the subject of the invention will become apparent from the further claims and the ensuing description.

In an advantageous embodiment of the invention, a further valve inlet and a further valve opening, surrounded by a further valve seat, are provided in the valve housing. Two sealing faces cooperating with both valve seats are embodied, transversely spaced apart from ribs, on the coating of the closing body. With the pivot bearing of the valve member in the valve housing, done via the ribs, a double-seat valve controlled by a single valve member and having two separate valve inlets and one common valve outlet can be implemented in a simple way, and the valve inlets can be made to communicate in alternation with the valve outlet.

The invention is described in further detail below in terms of an exemplary embodiment shown in the drawings.

BRIEF DESCRIPTION OF THE DRAWINGS

FIG. 3 is a view from below of a valve member of the device in the direction of the arrow III in FIG. 2; and FIG. 4 is a section taken along the line IV-IV in FIG. 3.

DESCRIPTION OF THE PREFERRED EMBODIMENT

Figure 1:
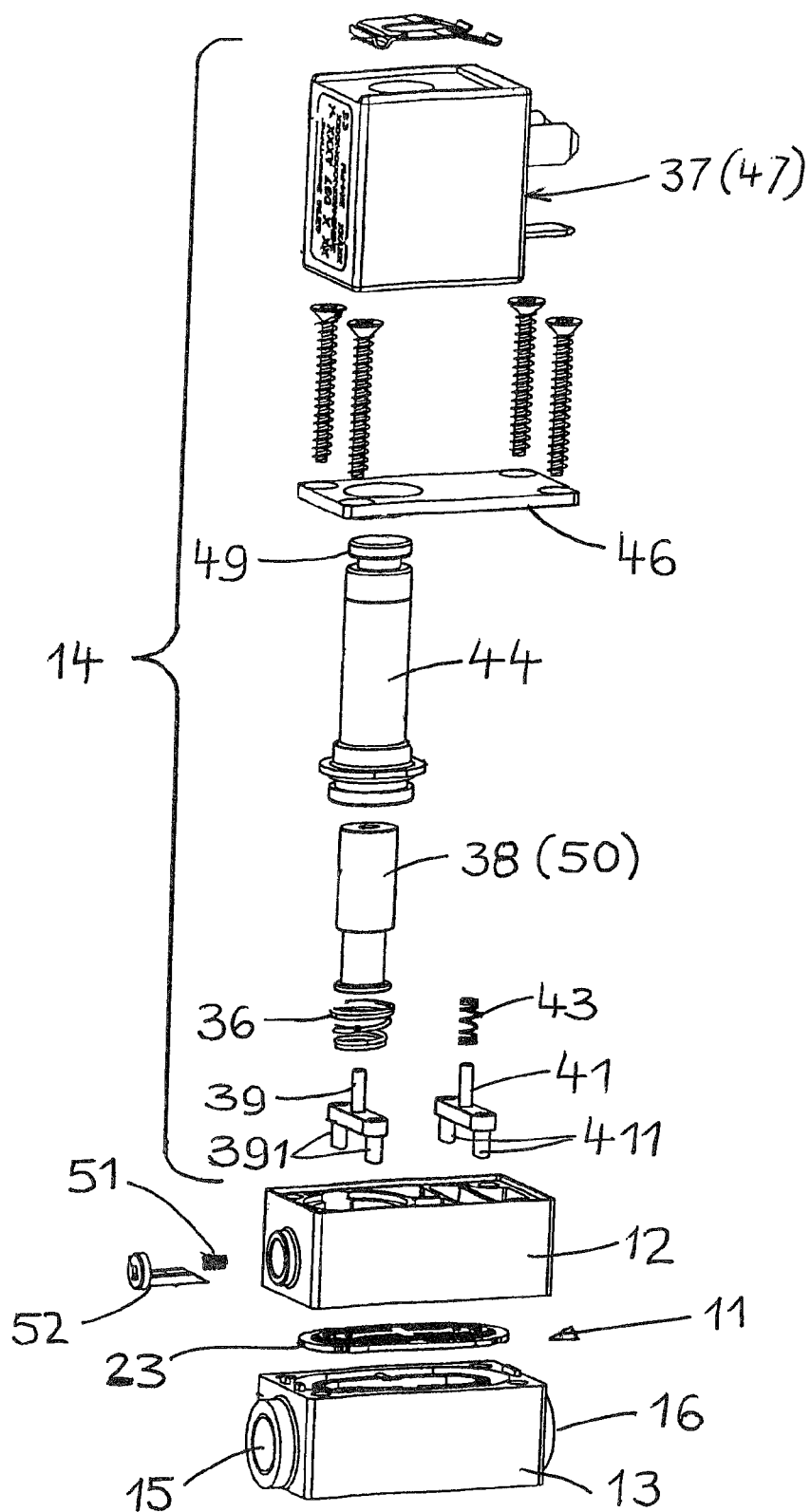
FIG. 1 is an exploded view of a device for regulating the flow of a fluid.
Figure 2:
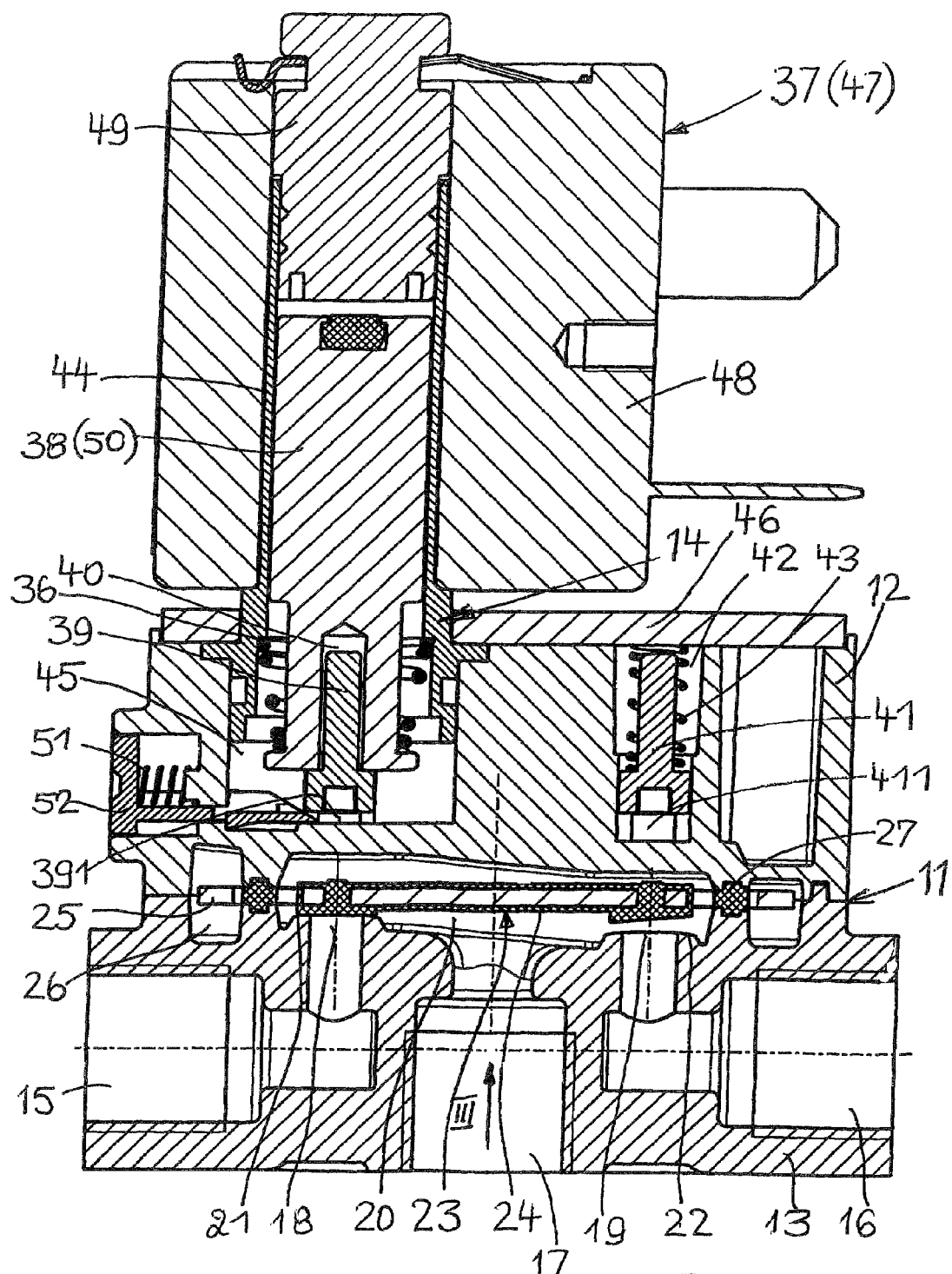
FIG. 2 is a longitudinal section through a device in FIG. 1.

The device shown in FIGS. 1 and 2 for regulating the flow of a fluid or flowing medium, such as a liquid or gaseous medium, has a two-part valve housing 11, which is composed of an upper housing part 12 and a lower housing part 13. The medium flows through the lower housing part 13, while in the upper housing part 12, an actuating device 14, separated from the medium, is received at least partly for regulating the flow of the medium.

In the lower housing part 13 of the valve housing 11, on sides facing away from one another, two valve inlets 15, 16 and one valve outlet 17 located between them are provided. Between the valve inlet 15 and the valve outlet 17, there is a first valve opening 18, and between the valve inlet 16 and the valve outlet 17, there is a second valve opening 19. The axes of the two valve openings 18, 19 are oriented parallel to one another. Both valve openings 18, 19 are located in a valve chamber 20, which is embodied at the interface between the upper housing part 12 and the lower housing part 13; an upper part of the valve chamber 20 is machined into the upper housing part 12, and a lower part of the valve chamber 20 is machined into the lower housing part 13.

The first valve opening 18 is surrounded by a first valve seat 21, and the second valve opening 19 is surrounded by a second valve seat 22, in each case concentrically. The two valve openings 18, 19 are controlled by a single valve member 23, and in alternation, one valve opening 18 is uncovered and the other valve opening 19 is closed. The valve member 23 is actuated by the actuating device 14, which will be described in further detail hereinafter; when the actuating device 14 is inactive, the valve member 23 closes the first valve opening 18 and uncovers the second valve opening 19, as is shown in FIG. 2.

The valve member 23 has a closing body 24, located in the valve chamber 20, that cooperates with the valve seats 21, 22, and it also has a frame 25, separated from the medium and surrounding the closing body 24 with spacing, that is solidly joined to the closing body 24. The frame 25 is located in a hollow chamber 26 surrounding the valve chamber 20. The hollow chamber 26 is likewise located at the interface between the two housing parts 12, 13; an upper part of the ringlike hollow chamber 26 is machined into the upper housing part 12, and a lower part of the hollow chamber 26 is machined into the lower housing part 13.

The valve chamber 20 and the hollow chamber 26 are hermetically separated from one another by a closed-ringlike seal 27 that is fixed between the two housing parts 12, 13. The closing body 24 has a flat cross-shaped support 28 and a coating 29, for instance of plastic, rubber, an elastomer, or the like, that sheathes the support 28. The frame 25 is rigidly joined to the two shorter arms of the crosslike support 28 via ribs 30, 31, for instance two in number, diametrically opposite one another centrally on the frame 25, and the ribs 30, 31 penetrate the seal 27 transversely to its longitudinal direction, and after fastening of the seal 27 between the two housing parts 12, 13, they form a pivot bearing for the valve member 23.

Holes 32 and 33 are made on the ends of each of the two longer arms of the cross in the support 28. In the production of the coating 29 that sheathes the support 28, the holes 32, 33 are filled with plastic, and in the region of the holes 32, 33 on the underside of the coating 29, facing toward the valve seats 21, 22, sealing faces 34, 35 are embodied that cooperate with the valve seats 21, 22. The valve seats 21, 22, on sides of the pivot bearing of the valve member 23 facing away from one another and located at the same spacing from it and offset from one another, are plane and have different vertical spacings from the pivot bearing; the vertical spacing of the second valve seat 22 is greater than that of the first valve seat 21.

The term vertical spacing is understood to mean the spacing of the plane, in which the plane valve seat 21 or 22 is located, from the pivot bearing. The sealing face 34 cooperating with the first valve seat 21 is oriented parallel to the plane of the frame 25 and support 28, while the sealing face 35 that cooperates with the second valve seat 22, which is offset relative to the first valve seat 21, is oriented at an acute angle to the plane of the frame 25 and support 28. The positioning angle of the sealing face 35 corresponds to the pivot angle of the valve member 23 by which the valve member 23, is pivoted in order to close the second valve opening 19 and uncover the first valve opening 18.

The frame 25, the support 28, and the two ribs 30, 31 joining them to one another are produced in one piece as a stamping from a metal sheet. The coating 29 is advantageously produced by extrusion coating of the support 28, for instance with plastic, rubber, an elastomer, or the like. In the extrusion coating of the support 28, simultaneously the closed-ringlike seal 27, which covers the ribs 30, 31 on both sides that extend from the frame 25 to the support 28 and are in one piece with the frame 25 and the support 28, is produced jointly from the same material.

It is understood that it is possible to provide the valve housing 11 with only one valve inlet, such as the valve inlet 15, and the valve outlet 17, with the valve member 23 remaining unchanged, but in that case the second sealing face 35 is omitted.

The valve member actuating device 14, placed on the upper housing cap 12 of the valve housing 11 and received partly in the upper housing part 12, has a valve closing spring 36 and an actuator 37, with a drive member 38 for the valve member 23, the drive member operating counter to the force of the valve closing spring 36. The actuator 37 is placed on the upper housing part 12 and with a guide sleeve 44 for the drive member 38 it dips into a receiving chamber 45 embodied in the upper housing part 12. A pressure fork 39 with two tines 391 is located on the face end of the drive member 38.

The two tines 391, as a result of the spring force of the valve closing spring 36 engaging the drive member 38, rest on two points of the frame 25, which are diametrically opposite one another at the first valve opening 18. In FIG. 3, solely for the sake of clarity, these two points are shown in dashed lines on the frame 25 and are marked 251.

In the exemplary embodiment shown, the pressure fork 39 is inserted loosely into a central face-end recess 40. At the same time, a further pressure fork 41 is guided axially displaceably with two tines 411 (FIGS. 1 and 2) in a guide shaft 42 that is machined into the upper housing part 12 of the valve housing 11. The tines 411 of the further pressure fork 41 also rest on the frame 25, specifically at two points 252 opposite one another at the second valve opening 19, and are pressed against the frame 25 by a compression spring 43, which is slipped onto the stem of the pressure fork 41, and are braced on one end on the pressure fork 41 and on the other on the housing.

The spring force of the compression spring 43 is less than the spring force of the valve closing spring 36, and thus the further pressure fork 41 is not capable of pressing the valve member 23, with the sealing face 35, onto the second valve seat 22 until, by axial displacement of the drive member 38, the closing force of the valve closing spring 36, acting on the valve closing member 23 at the site of the first valve opening 18, has been rescinded.

A cover plate 46, placed on the top of the upper housing part 12 and screwed in the valve housing 11, closes off both the receiving chamber 45, with fixation of the guide sleeve 44, and the guide shaft 42 of the further pressure fork 41, and the compression spring 43 seated on the pressure fork 41 is braced on the cover plate 46.

If the actuator 37 is inactive, then the valve member 23 assumes its position in FIG. 2, in which the sealing face 34 is pressed by the valve closing spring 36 against the first valve seat 21 at the first valve opening 18, and the sealing face 35 is lifted from the second valve seat 22 at the second valve opening 19. In this case, a flow course is opened up from the valve inlet 16 to the valve outlet 17, and the flow course from the valve inlet 15 to the valve outlet 17 is blocked. If the actuator 37 is activated, then the drive member 38 is displaced upward, counter to the force of the valve closing spring 36. By the spring force of the compression spring 43, the pressure fork 41 pivots the valve member 23 about the pivot bearing at the ribs 30, 31 and presses the valve member 23, with the sealing face 35, onto the second valve seat 22 at the second valve opening 19. The flow course from the valve inlet 16 to the valve outlet 17 is blocked, and the flow course from the valve inlet 15 to the valve outlet 17 is opened.

In the exemplary embodiment described here, the actuator 37 is embodied as an electromagnet 47, with an exciter coil 48 surrounding the guide sleeve 44, a magnet core 49 that dips into the guide sleeve 44, and an armature 50 that is axially displaceable in the guide sleeve 44 and that forms the drive member 38 of the actuator 37. However, a piezoelectric, magnetostrictive, pneumatic, or similarly functioning actuator may be used as the actuator 37 instead.

In the described device for regulating the flow of a liquid or gaseous medium, manual actuation for uncovering the first valve opening 18 in the event of failure of the actuator 37 or for starting up the device without auxiliary energy is provided for. The manual actuation may be a rotatable, locking, or similar motion. In the exemplary embodiment shown with sliding actuation, the manual actuation involves has a sliding key 52, which is displaceable counter to the force of a restoring spring 51 and which has a sliding wedge. When the sliding key 52 is pressed inward counter to the force of the restoring spring 51, the sliding wedge slides underneath the pressure fork 39 and lifts it from the valve member 23 counter to the force of the valve closing spring 36, so that by means of the compression spring 43, the valve member 23 can be pivoted, thereby uncovering the first valve opening 18.

The invention claimed is:

1. A device for regulating the flow of a liquid or gaseous medium, having a valve housing (11), which has at least one valve inlet (15, 16) and a valve outlet (17) and at least one valve opening (18, 19), located between the at least one valve inlet (15, 16) and the valve outlet (17) and surrounded by a valve seat (21, 22), having a valve member (23) controlling the valve opening (18, 19), and having a valve member actuating device (14), which has a valve closing spring (36) and an actuator (37) operating counter to the restoring force of the valve closing spring (36), wherein the valve member (23) has a closing body (24), cooperating with the at least one valve seat (21, 22), and a frame (25), which is separated from the medium and which surrounds the closing body (24) and is solidly connected to it; and that the valve member actuating device (14) engages the frame (25), wherein the valve housing (11) is composed of a lower housing part (13), through which the medium flows, and an upper housing part (12), at least partly receiving the valve member actuating device (14); wherein the valve chamber (20) that receives the closing body (24), the hollow chamber (26) that receives the frame (25), and the ringlike seal (27) between the valve chamber (20) and the hollow chamber (26) are located at the interface of the two housing parts (12, 13); and wherein the actuator (37) has a drive member (38), which is displaceable counter to the force of the valve closing spring (36); wherein a pressure fork (39) with two tines (391) is located on the face end of the drive member (38); and wherein the two tines (391), as a result of the spring force of the valve closing spring (36) engaging the drive member (38), rest on two points (251) of the frame (25) that are diametrically opposite one another at the at least one valve opening (18).

2. The device as defined by claim 1, wherein the closing body (24) is located in a valve chamber (20), which is located downstream of the at least one valve opening (18, 19) and through which the medium flows, and the frame (25) is located in a hollow chamber (26) surrounding the valve chamber (20); and that the valve chamber (20) and the hollow chamber (26) are separated from one another by a closed-ringlike seal (27).

3. The device as defined by claim 1, wherein the closing body (24) has a support (28), which is rigidly connected to the frame (25) via ribs (30, 31), and a coating (29) sheathing the support (28), on which coating at least one sealing face (34, 35), transversely spaced apart from the ribs (30, 31) and cooperating with the at least one valve seated (21, 22), is embodied.

4. The device as defined by claim 3, wherein the ringlike seal (27) is fixed at the ribs (30, 31) in such a way that it is penetrated by the ribs (30, 31) transversely to its longitudinal direction; and that the penetration points form a pivot bearing for the valve member (23).

5. The device as defined by claim 3, wherein the seal (27) and/or the coating (29) is formed of plastic, rubber, an elastomer, or the like, for instance both comprising the same material.

6. The device as defined by claim 3, wherein in the valve housing (11), a further valve inlet (16) and a further valve opening (19), surrounded by a further valve seat (22), are present; and that on the coating (29) of the closing body (24), a sealing face (35) cooperating with the further valve seat (22) is embodied, which is located with transverse spacing from the ribs (30, 31) on the side of the closing body (24) facing away from the first sealing face (34).

7. The device as defined by claim 6, wherein the two valve seats (21, 22), located on both sides of the pivot bearing of the valve member (23) have different-sized vertical spacings from the pivot bearing; and that the one sealing face (34) has a parallel orientation, and the other sealing face (35) has an acute-angled orientation, corresponding to the pivot angle of the valve member (23), to the plane of the frame (25) and support (28), and the sealing face (35) having the acute-angled orientation cooperates with the valve seat (22) having the greater vertical spacing.

8. The device as defined by claim 6, wherein in the vicinity of each sealing face (34, 35) embodied on the closing body (24), there is a hole (32, 33) in the support (28) that is filled with material of the coating (29).

9. The device as defined by claim 3, wherein the frame (25) and the cross-shaped support (28) as well as the ribs (30, 31) joining the frame (25) and the support (28) to one another are produced as a one-piece stamped stamping from a metal sheet.

10. . The device as defined by claim 9, wherein the frame (25) is substantially elliptical and the support (28) is cross-shaped.

11. The device as defined by claim 3, wherein the ribs (30, 31) include two diametrically extending ribs.

12. The device as defined by claim 1, wherein the ringlike seal (27) is fastened between the upper and lower housing parts (12, 13) of the valve housing (11).

13. The device as defined by claim 1, wherein the valve chamber (20) and the hollow chamber (26) are each machined partly into the upper housing part (12) and partly into in the lower housing part (13), respectively.

14. The device as defined by claim 1, wherein the pressure fork (39) is inserted loosely into a face-end recess (40) in the drive member (38); and that a further pressure fork (41) with two tines (411) is guided axially displaceably in the upper housing part (12) of the valve housing (11) and is pressed with its tines (411), on the side of the pivot bearing of the valve member (23) facing away from the first pressure fork (39), at opposed points (252) of the frame (25) by a compression spring (43); and that the spring force of the compression spring (43) is less than the spring force of the valve closing spring (36).

15. The device as defined by claim 14, wherein the engagement points (252) of the tines (411) of the further pressure fork (41) are diametrically opposite one another on the frame (25) at the further valve opening (19).

16. The device as defined by claim 1, wherein the actuator (37) is placed on the upper housing part (12) and, with a guide sleeve (44) for the drive member (38), dips into a receiving chamber (45) embodied in the upper housing part (12); and that the valve closing spring (36) is braced on one end on the guide sleeve (44) and on the other on the drive member (38).

17. The device as defined by claim 1, wherein the actuator (37) is an electromagnet (47), and the drive member (38) is an armature (50) of the electromagnet (47).

* * * * *